United States Patent [19]
Linoff et al.

[11] Patent Number: 5,953,723
[45] Date of Patent: Sep. 14, 1999

[54] SYSTEM AND METHOD FOR COMPRESSING INVERTED INDEX FILES IN DOCUMENT SEARCH/RETRIEVAL SYSTEM

[75] Inventors: Gordon S. Linoff, Boston; Craig W. Stanfill, Waltham, both of Mass.

[73] Assignee: T.M. Patents, L.P., Boston, Mass.

[21] Appl. No.: 08/042,357

[22] Filed: Apr. 2, 1993

[51] Int. Cl.$^6$ .................................................. G06F 17/30
[52] U.S. Cl. ................................................ 707/102; 707/4
[58] Field of Search ........................... 395/600; 707/102, 707/4

[56] References Cited

U.S. PATENT DOCUMENTS

| | | | |
|---|---|---|---|
| 4,923,314 | 5/1990 | Blanchard, Jr. et al. .................. | 400/63 |
| 5,168,533 | 12/1992 | Kato et al. ................... | 382/54 |
| 5,303,367 | 4/1994 | Leenstra, Sr. et al. ................. | 395/600 |
| 5,331,554 | 7/1994 | Graham ............................. | 364/419.07 |
| 5,659,727 | 8/1997 | Velissaropoulos et al. ................ | 707/2 |
| 5,764,977 | 6/1998 | Oulid-Aissa et al. ..................... | 707/10 |

*Primary Examiner*—Wayne Amsbury
*Attorney, Agent, or Firm*—Cesari & McKenna, LLP

[57] ABSTRACT

A document query processing system comprising a document database and a document query processor. The document database includes a document text base, an encoded index file, and a dictionary. The document text base includes document text in which each have an associated location identifier in the document. The encoded index file including a plurality of encoded records, each for a different word in the document text base. Each record has a locator entry associated with each instance in the document text base of the word associated with the record, the locator entries containing encoded locator values identifying locations of instances of the word in the document text base. The dictionary includes record location identifiers pointing to the location in the encoded index file of each encoded record. The query processing element includes a dictionary lookup element to identify the locations of records in the dictionary corresponding to each query word, and an encoded index file processing element for using the record location identifier identified by the dictionary to locate a record in the encoded index file for the query words and decoding the encoded locator values in the locator entries of the record to generate pointers each identifing locations in the document text base of instances of the the query word. An encoding arrangement for generating the encoded index file is also disclosed.

3 Claims, 15 Drawing Sheets

"n, s" ENCODINGS

| i | COMPRESSED ENCODING | SECTION N | i' | i | COMPRESSED ENCODING | SECTION N | i' |
|---|---|---|---|---|---|---|---|
| 0 | -- -- -- 11 | 0 | 0 | 13 | 00 00 00 11 | | 0 |
| | | | | 14 | 00 00 01 11 | | 1 |
| 1 | -- -- 00 11 | | 0 | 15 | 00 00 10 11 | | 2 |
| 2 | -- -- 01 11 | 1 | 1 | 16 | 00 01 00 11 | | 3 |
| 3 | -- -- 10 11 | | 2 | 17 | 00 01 01 11 | | 4 |
| | | | | 18 | 00 01 10 11 | | 5 |
| 4 | -- 00 00 11 | | 0 | 19 | 00 10 00 11 | | 6 |
| 5 | -- 00 01 11 | | 1 | 20 | 00 10 01 11 | | 7 |
| 6 | -- 00 10 11 | | 2 | 21 | 00 10 10 11 | | 8 |
| 7 | -- 01 00 11 | | 3 | 22 | 00 00 00 11 | | 9 |
| 8 | -- 01 01 11 | 2 | 4 | 23 | 01 00 01 11 | | 10 |
| 9 | -- 01 10 11 | | 5 | 24 | 01 00 10 11 | 3 | 11 |
| 10 | -- 10 00 11 | | 6 | 25 | 01 01 00 11 | | 12 |
| 11 | -- 10 01 11 | | 7 | 26 | 01 01 01 11 | | 13 |
| 12 | -- 10 10 11 | | 8 | 27 | 01 01 10 11 | | 14 |
| | | | | 28 | 01 10 00 11 | | 15 |
| | | | | 29 | 01 10 01 11 | | 16 |
| | | | | 30 | 01 10 10 11 | | 17 |
| | | | | 31 | 10 00 00 11 | | 18 |
| | | | | 32 | 10 00 01 11 | | 19 |
| | | | | 33 | 10 00 10 11 | | 20 |
| | | | | 34 | 10 01 00 11 | | 21 |
| | | | | 35 | 10 01 01 11 | | 22 |
| | | | | 36 | 10 01 10 11 | | 23 |
| | | | | 37 | 10 10 00 11 | | 24 |
| | | | | 38 | 10 10 01 11 | | 25 |
| | | | | 39 | 10 10 10 11 | | 26 |

WHERE:
(1) *-* INDICATES NO BIT
(2) COMPRESSED ENCODING INCLUDE STOP BITS

FIG. 6

SYSTEM AND METHOD FOR COMPRESSING INVERTED INDEX FILES IN DOCUMENT SEARCH/RETRIEVAL SYSTEM

FIELD OF THE INVENTION

The invention relates generally to the field of digital computer systems, and more particularly to document search and retrieval systems. In particular, the invention relates to a system and method for compressing inverted files used in document search and retrieval systems.

BACKGROUND OF THE INVENTION

Digital computers are often used to identify documents which contain particular textual elements such as words or phrases. Typically, an operator searching through a "document base" will be trying to identify those documents in the document base which are directed to particular topics. The topics will be characterized by one or more search queries, each of which contains a word, a phrase of one or more words comprising a text string, a relation of one word in a selected proximity relationship to another word or phrase, or the like.

In a conventional serial computer, a search in response to a query may proceed in a number of ways. In one way, the computer may, for each document in the document base, try to perform an initial search in which it compares the first word in the query, $QW_1$, with each successive word $DW_i$ in the document. When the computer finds a word $DW_I$ in the document which matches the first word $QW_1$ of the query, it proceeds to compare the successive words $DW_{i+k}$ in the document against the successive words $QW_{1+k}$ in the query, for each index "K," and if they compare positively, the document is identified as one which meets the query. On the other hand, if the computer determines that a word $DW_{i+k}$ in the query document does not favorably compare to the corresponding word $QW_{1+k}$ in the search query, it resumes the initial search with the word $DW_{i+1}$ in the document text, following the one which gave rise to the previous initial match, comparing it with the first word $QW_1$ of the query. The computer may perform similar operations if the query requests identification of documents in which a word has a selected proximity relationship to another word or phrase, except that it may not perform the comparison with respect to each subsequent word of the document, but only with respect to words which have the required proximity relationship to the first word of the query.

On a conventional serial computer, the search mechanism described above can be very time-consuming, and modern document search and retrieval systems have been developed to speed up searching. Most such systems have document bases which have the same three basic components, namely, a dictionary, an inverted index and a document textbase. The dictionary contains a list of all of the words which may be used in a query, which generally will be all of the words in the texts of all of the documents except for certain short or oft-used words such as articles ("a," "an" and "the"), pronouns, and the like. The inverted index lists the words which can be searched in, for example, alphabetical order, and accompanying each word are pointers which identify the particular documents which contain the word as well as the locations in each document at which the word occurs. Finally, the document textbase contains the actual text of each document which may be searched. To perform a search, instead of scanning through the documents in word order, the computer locates the pointers for the particular words identified in the query and processes them to identify the documents in which they have the required order or proximity relationship. After identifying the documents which satisfy the query, the computer may use the pointers from the inverted index to locate in the document textbase the particular documents, and locations in each document, which satisfy the query, and provides them to an operator.

In many document retrieval systems, the computer files which contain the components of the document base become quite large, and a significant amount of time may be required to transfer portions required from secondary storage into main memory for processing.

SUMMARY OF THE INVENTION

The invention provides a new and improved document search and retrieval system including a compressed inverted index file, and a system and method for compressing an inverted index file for use in the document search and retrieval system.

In brief summary the invention provides, in one aspect, a document query processing system comprising a document database and a document query processor. The document database includes a document text base, an encoded index file, and a dictionary. The document text base includes document tex in which each have an associated location identifier in the document. The encoded index file including a plurality of encoded records, each for a different word in the document text base. Each record havs a locator entry associated with each instance in the document text base of the word associated with the record, the locator entries containing encoded locator values identifying locations of instances of the word in the document text base. The dictionary includes record location identifiers pointing to the location in the encoded index file of each encoded record. The query processing element includes a dictionary lookup element to identify the locations of records in the dictionary corresponding to each query word, and an encoded index file processing element for using the record location identifier identified by the dictionary to locate a records in the encoded index file for the query words and decoding the encoded locator values in the locator entries of the record to generate pointers each identifing locations in the document text base of instances of the the query word.

In another aspect, the invention provides a document database generator for generating a document database for use in connection with a document query processing system. The document database generator generating an encoded index file and a dictionary in response to a document text base, which includes a plurality of words organized into at least one document, each word having an associated location identifier identifying the location of the word in the document, the location identifier having a series of location identifier entries for identifying the location in the document of the associated word in a location hierarchy. The document database generator comprises an index file generating element, an encoded index file generating element and a dictionary generating element. The index file generating element generates an index file including a plurality of records each associated with a unique word in the document text base. Each record has at least one locator entry, with each locator entry identifying a location of the word in the document. Each locator entry, in turn, has a series of locator fields containing locator values according to a location hierarchy. The encoded index file generating element generats, in response to the index file generated by the index file generating element, an encoded index file. The encoded index file generating element in generating the encoded index file selects locator entries in a record in the index file which have a series of locator fields which contain corresponding locator values, and substitutes for the series in one of the selected locator entries an indicator indicating the correspondence of the locator fields to the other of the selected locator entries. Finally, the dictionary generating element generates a dictionary file comprising a plurality of record location identifiers each identifying one of the words in the document text base and the location in the encoded index file of an encoded record associated with the identified word.

In yet another aspect, the invention provides an encoding system for generating an encoded representation for a value "i" in response to a base value "b," a value "n" identifying a number of characters in each of a series of encoding groups in the representation, and a value "s" identifying a number of characters in a termination identifier identifying the end of the encoded representation. Initially, an encoding group number determining element for determining a value "N" identifying the number of encoding groups for the representation in accordance with $$N=GI\{log_b[(b-1)i+1]\}$$

where "GI" represents the greatest integer function. An encoded value difference determination element uses the value of "N" as determined by the encoding group number determining element, and the value of base "b", to determine an encoded value difference value $\delta$ in accordance with $$\delta=(b^N-1)/(b-1).$$

An encoded value identifer element uss the encoded value difference value $\delta$ to generate an encoded value i' in accordance with $$i'=i-\delta;$$

An encoding group value determining element determines values of each encoding group $a_j$ in accordance with $$i'=\Sigma a_j b^j \text{ (sum over "j" from zero to N-1)}.$$

Finally, an encoded representation generating element uses the values of each encoding group $a_j$ and the value of the termination identifier "s" to generate the encoded representation.

In yet a further aspect, the invention provides a decoded value generating system A decoded value generating system for generating a value "i" in response to an encoded representation for an encoded value i', a base value "b," a value "n" identifying a number of coding characters in each of a series of encoding groups in the representation, and a value "s" identifying a number of characters in a termination identifier identifying the end of the encoded representation. Initially an encoding group number identification element identifies, in response to the encoded representation and the termination identifer, a value "N" corresponding to the number of encoding groups in the encoded representation. An encoded value determination element determines a value $a_j$ for each successive encoding group and for using successive encoding group values, the base value "b" and the value of "N" to determine an encoded value i' for the encoded representation in accordance with $$i'=\Sigma a_j b^j \text{ (sum over "j" from zero to N-1)};$$

An encoded value difference determination element uses the value of "N" as determined by the encoding group identification element, and the value of base "b", to determine an encoded value difference value $\delta$ in accordance with $$\delta=(b^N-1)/(b-1).$$

A decoded value determining element determines the value "i" in response to the value i' of the encoded representation and the encoded value difference value $\delta$ in accordance with $$i=i'+\delta.$$

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 6 is a table useful in understanding the compression technique used in generating compressed values for various fields of the encoded index file.

DETAILED DESCRIPTION OF AN ILLUSTRATIVE EMBODIMENT

Figure 1:
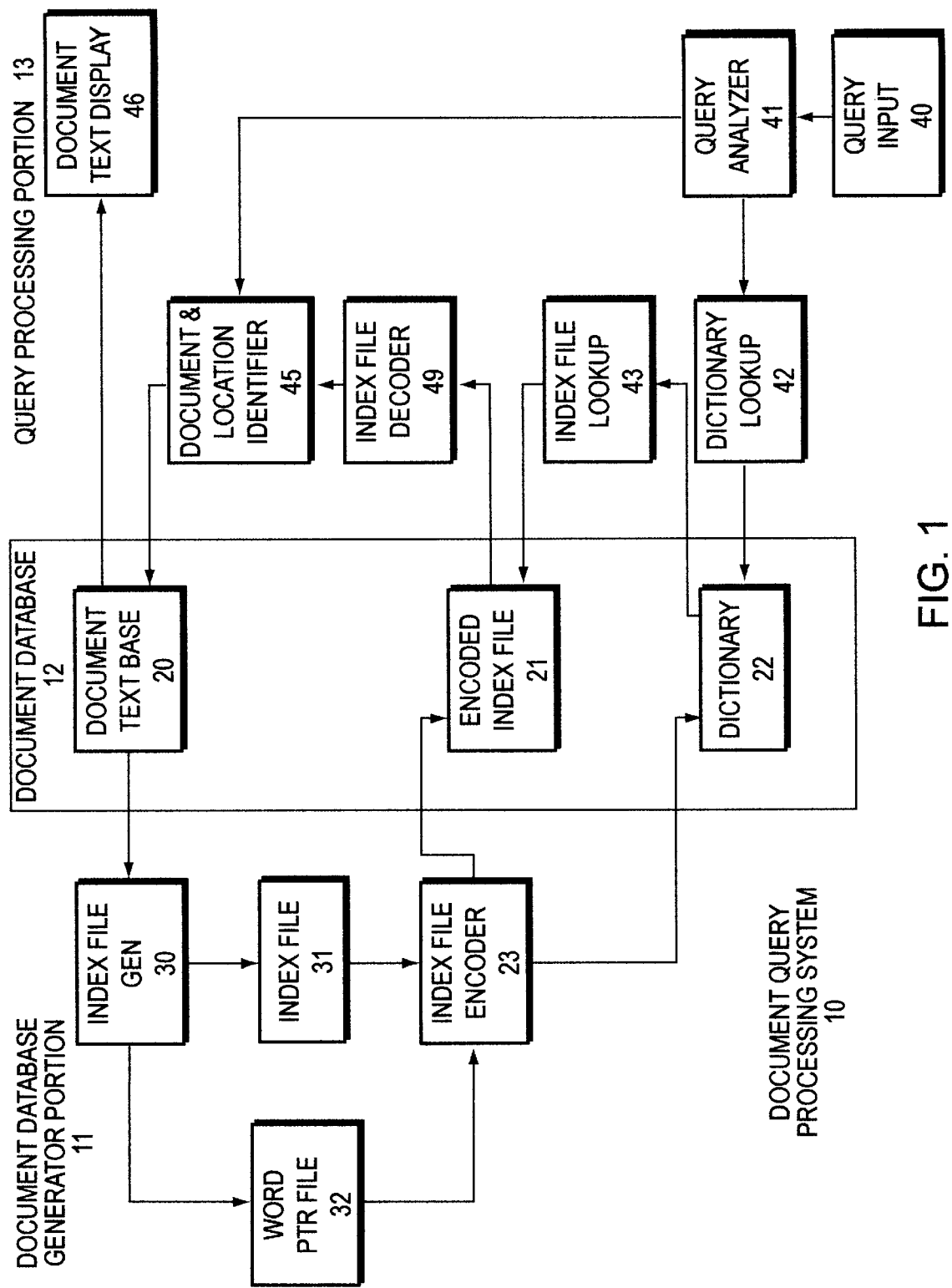
FIG. 1 is a functional block diagram of a document query processing system that is useful in understanding the invention.

FIG. 1 is a functional block diagram of a document query processing system 10 that is useful in understanding the invention. With reference to FIG. 1, the document query processing system 10 permits a user to locate documents which contain words or other search terms (generally identified as "words") by means of a query. The query contains one or more words or other search terms, and may also contain indicia identifying selected relationships among search terms which the system 10 will use in determining whether particular documents satisfy the query.

Figure 2A:
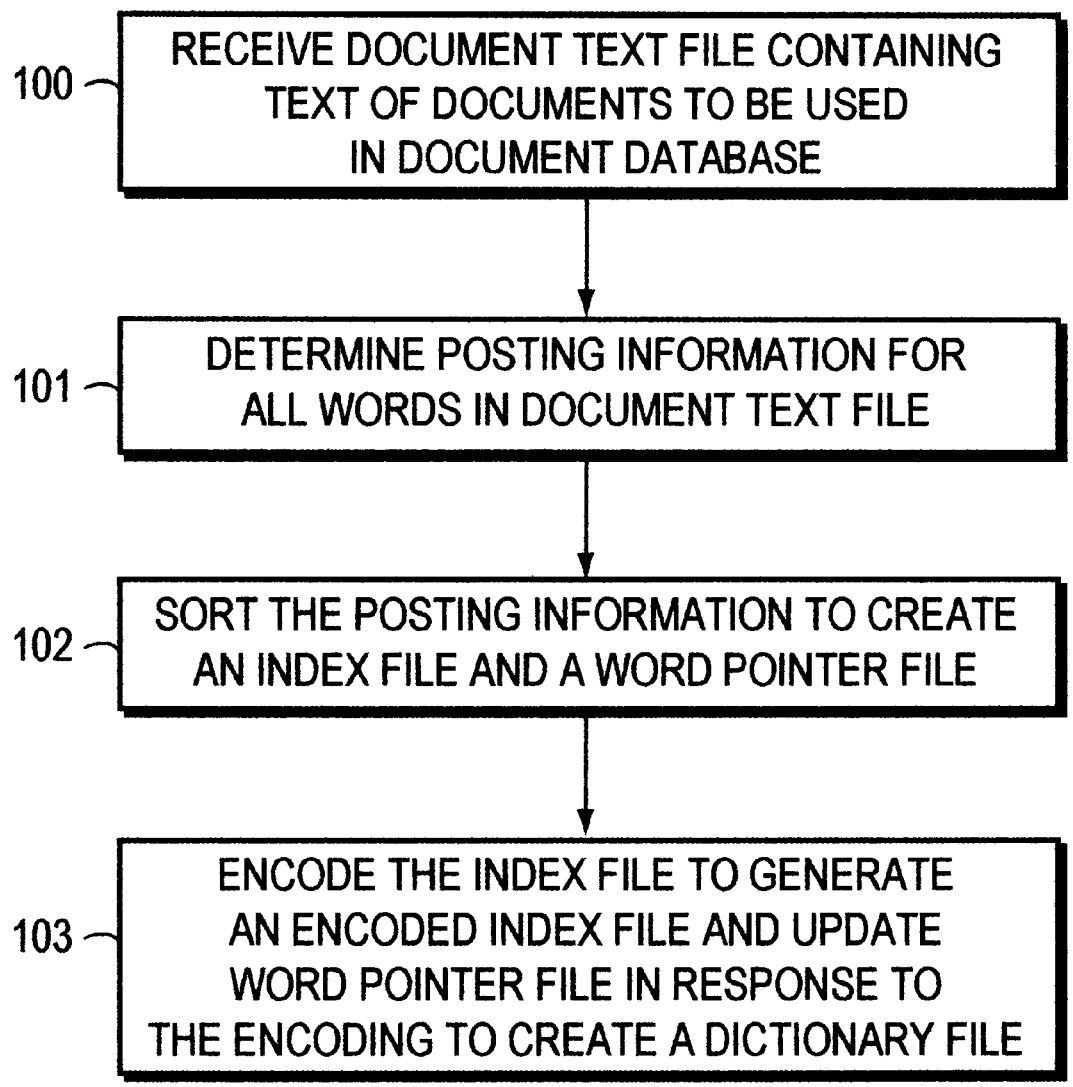
FIGS. 2A and 2B are flow charts which generally depicts the operation of the document database generator portion and query processing system of the document query processing system depicted in FIG. 1.
Figure 2B:
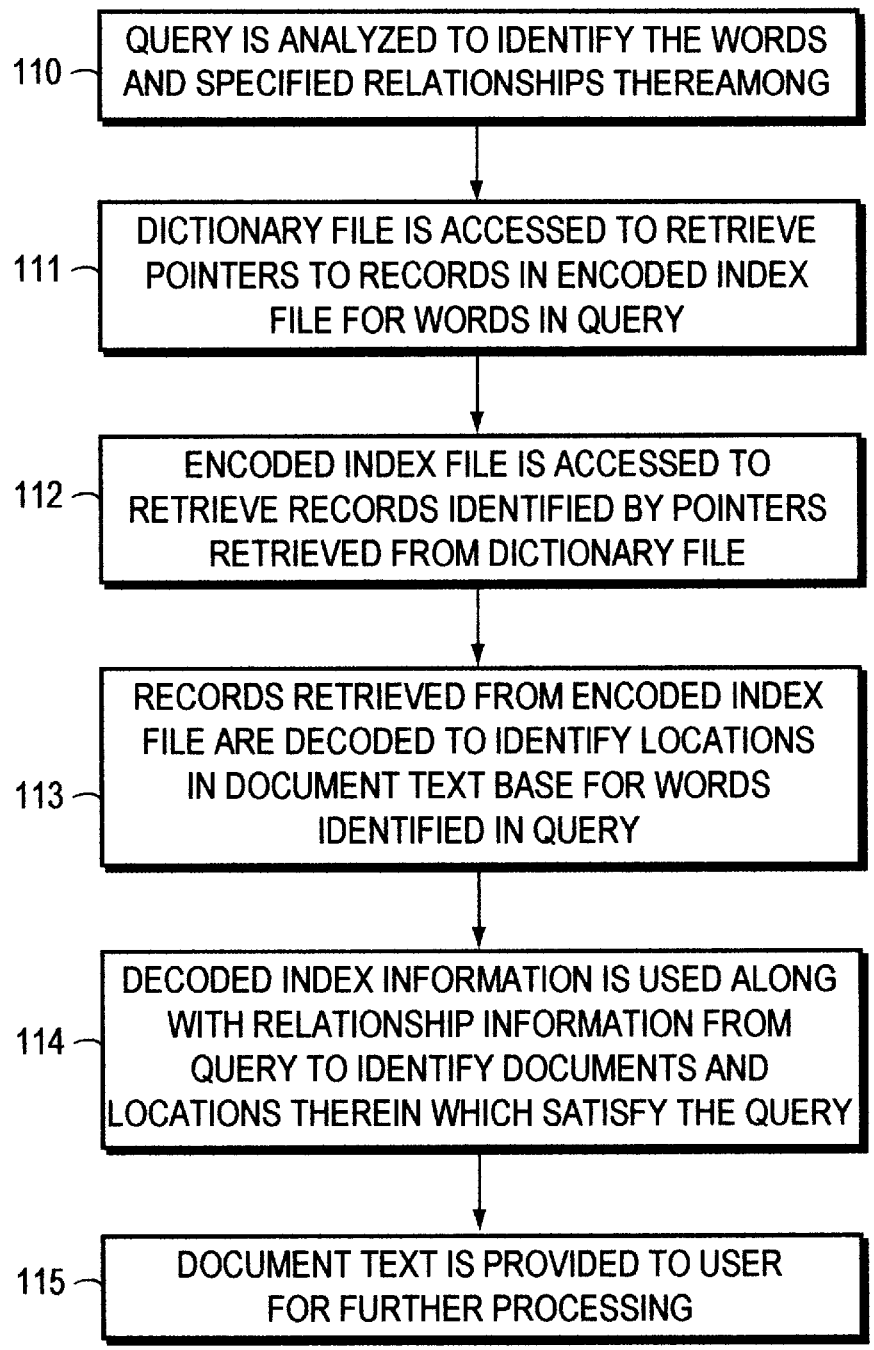

The system 10 includes three general portions, namely, a document database generator portion 11, a document database 12 and a query processing portion 13, all of which represent elements of a suitably programmed digital computer system. The document database 12 includes a document text base 20, an encoded index file 21 and a dictionary 22. The document text base 20 contains one or more files which together contain, in text order, the texts of documents with respect to which queries may be made. The encoded index file 21, which will be described below in detail in connection with FIG. 2B, contains a record for each of the words which may be used in a query, which record identifies the particular locations in the documents in the document text base 20 at which the word occurs. The records for the different words in the encoded index file 2 may differ in length, with the length of a particular record depending on the number of occurrences of the word in the document text base 20. The dictionary 22 contains a record for each of the words in the encoded index file 21 which contains a pointer into the encoded index file 21 to the record of the encoded index file 21 for the word.

The document database generator portion 11 generates the encoded index file 21 and the dictionary 22 from the contents of the document text base 20. The document database generator portion 11 will be described in connection with FIGS. 1 and 2A. With reference to those Figs., the files of the document text base 20 containing the text of the documents to be used in the document database 12 are initially received by an index file generator module 30 (step 100). The index file generator module 30 generates posting information for each word in the document text base 20 identifying the locations of the word in each document (step 101) and sorts the posting information to create an index file 31 and a word pointer file 32 (step 102). The structure of the index file 31 used in one embodiment will be described below in connection with FIG. 3A. The word pointer file 32 is essentially a dictionary for the index file 31, that is, a file comprising a set of records, each for one of the words document text base, and a pointer into the index file 31 to the record for the associated word, with the pointer generally representing an offset from the beginning of the word pointer file to the record in the index file 31 for the associated word. Following step 102, an index file encoder module 32 receives the index file 31 and the word pointer file 32 and generates in response the encoded index file 21 and dictionary 22 (step 103). In the process of generating the encoded index file, the index file encoder effectively compresses the index file 31 to require less space for storage and to require less time to transfer from mass (that is, disk) storage to computer memory for processing. The operation of the index file encoder module 32 in generating the encoded index file 21 will be described below in connection with FIGS. 3B and 4A through 4D. It will be appreciated that the operation of the index file encoder 33 in generating the dictionary 22 will primarily comprise adjusting the pointers of the word pointer file 32 generated by the index file generator 30 to accommodate the encoding and compressing of the index file 31 to form the encoded index file 21.

The query processing portion 13 processes a query received from a user and selects in response document text from the document text base 20 which satisfies the query, which selected document text it outputs to the user for, for example, display or further processing. The query processing portion will be described in connection with FIGS. 1 and 2B. With reference to those Figs., a query is first received at a query input module 40 and analyzed by a query analyzer module 41 to identify the particular words and specified relationships, if any among the words that are required to satisfy the query (step 110). Thereafter, a dictionary lookup module 42 uses the identification of the words to access the dictionary file 22 to retrieve the pointers to the records in the encoded index file for the words in the query (step 111). The pointers obtained from the dictionary file 22 are provided to an index file lookup module 43, which uses them to obtain records from the encoded index file 21 associated with the words identified in the query (step 112). An index file decoder module 44 receives the records from the encoded index file 21 and decodes them (step 113) to identify the particular documents, and the locations in each document, at which the particular words identified in the query are located. The decoded index information, along with the information from the query regarding the relationships among the various words required to satisfy the query, are analyzed by a document and location identifier module 45 to identify documents in the document text base 20, and locations in the respective documents, at which words occur with the required proximity relationships as set forth in the query (step 114). The document text is then provided to the user for further processing (step 115). In the system 10 depicted in FIG. 1, the document text is provided to a document text display 46 for display to a user, but it will be appreciated that the document text may instead, or in addition, be provided as input information to other programs for analysis.

The various elements of the document query processing system 10 may comprise one or more conventional digital computers suitably programmed to perform the functions described above in connection with FIGS. 2A and 2B. In such a computer, the various files of the document database 12 will normally be stored in secondary storage, which normally comprises disk or other devices which are relatively slow in being accessed. In addition, the index file 31 may become quite large, as it will contain, within a record for each different word in the document text base 20, a pointer to the locations of the word in the various documents in the document text base 20. Accordingly, it may require a significant amount of time to transfer records from secondary storage to main memory for processing. The encoded index file 21, which as encoded has significantly smaller records, would require less time for transfer, and, if encoded as described below in connection with FIGS. 3B and 4A through 4D, will require only a small additional time in processing for decoding by the index file decoder module 44. Since the additional time required for decoding will be less than the time saved in the transfer from secondary storage, the document query processing system 10 can process queries faster by using the encoded index file 21 than the larger index file 31.

Figure 3A:
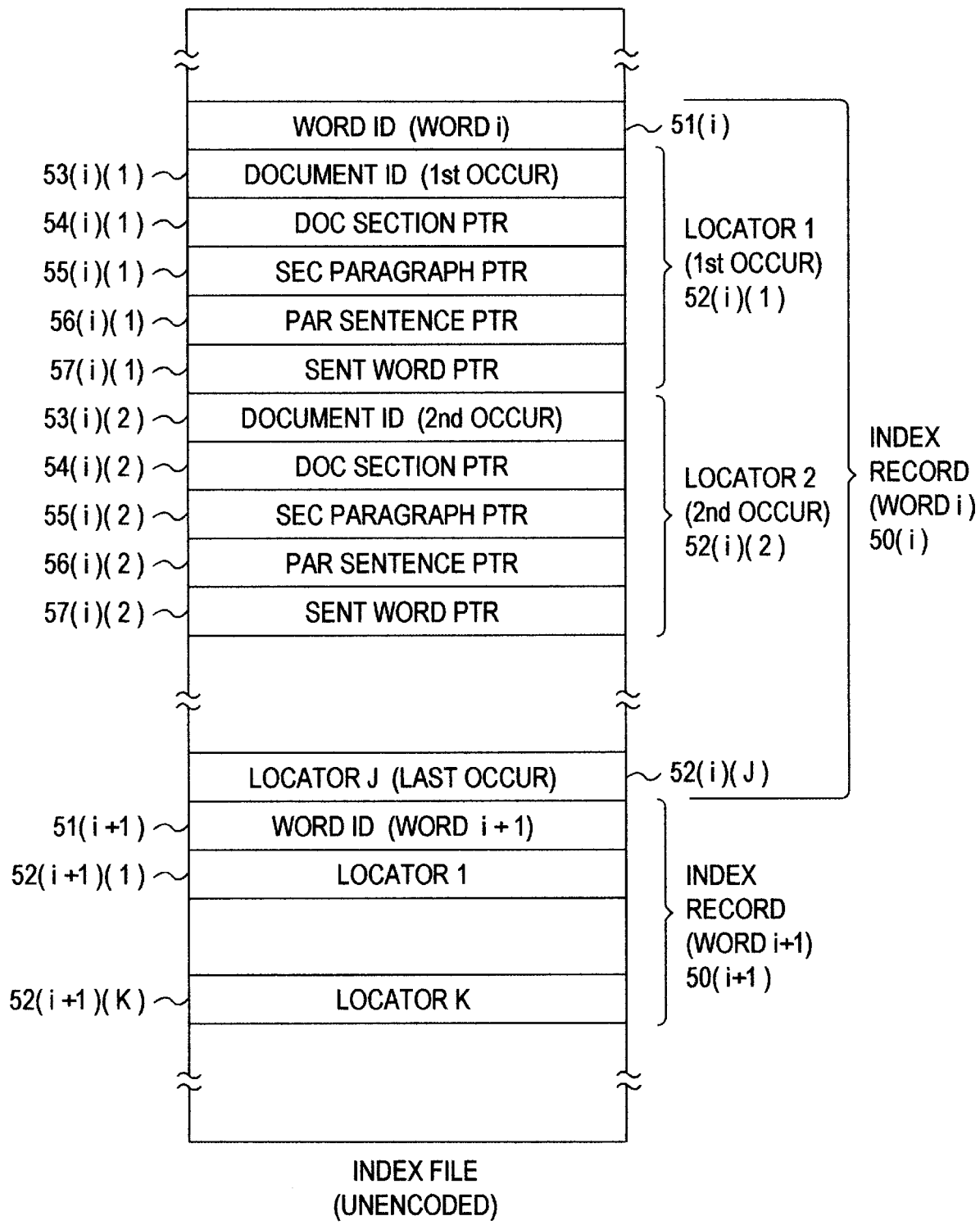
FIGS. 3A and 3B are diagrams of the structure of an index file and an encoded index file used in connection with the document query processing system depicted in FIG. 1.

With this background, the generation of the encoded index file 21 by the index file encoder 33 from the index file 31 will be described in connection with FIGS. 3B and 4A through 4D. Prior to describing these operations, it would be helpful to describe the structure of the unencoded index file 31, with is shown in FIG. 3A. With reference to FIG. 3A, the index file 31 comprises a plurality of index records 50(i) (index "i" having values associated with the number of diverse words in the document text base 20 which may be used in a query). The index records 50(i) may be organized according to any predetermined order. For example, the index records 50(i) may be organized in alphabetical order according to the respective associated words. Alternatively, each word may be associated with a word identifier value, with the word identifier values being encoded in binary form all having the same number of binary digits, and the index records 50(i) may be organized according to the order of the numerical values of the word identifier values.

Each index record 50(i) in the index file 31 includes a word identification field 51(i) which stores the word identifier value of the word associated with the index record 50(i) and one or more locator entries 52(i)(j). (In reference numeral 52(i)(j), "j" is an index having a maximum value associated with the number of occurrences of the word in the document text base 20. It will be appreciated that the range of index "j" may differ as among the words referenced in the index file 31, to reflect different numbers of occurrences of the words in the document text base 20.) Each locator entry 52(i)(j) contains information identifying the location of one occurrence of the word identified by the contents of the word identification field 51(i) in the document text base. The structure of the locator entries 52(i)(j) are all similar, and include a document identifier field 53(i)(j), a document section pointer field 54(i)(j), a section paragraph pointer field 55(i)(j), a paragraph sentence pointer field 56(i)(j), and a sentence word pointer field 57(i)(j). The document identifier field 53(i)(j) contains a value identifying, for the occurrence associated with the locator entry 52(i)(j), the particular document in the document text base 20. For one embodiment, documents may be divided into sections, and the document section pointer field 54(i)(j) contains a values identifying, for the occurrence associated with the locator entry 52(i)(j), the particular section. The section paragraph pointer field 55(i)(j), paragraph sentence pointer field 56(i)(j) and sentence word pointer field 57(i)(j) contain, respectively, values identifying, for the occurrence, the particular paragraph within the section, sentence within the paragraph, and word within the sentence at which the word occurs. Accordingly, the combination of the values contained in fields 54(i)(j), 55(i)(j), 56(i)(j) and 57(i)(j), provide a pointer to the specific location within the document identified in field 53(i)(j) at which the word occurs, for the occurrence associated with the locator entry 52(i)(j).

Figure 3B:
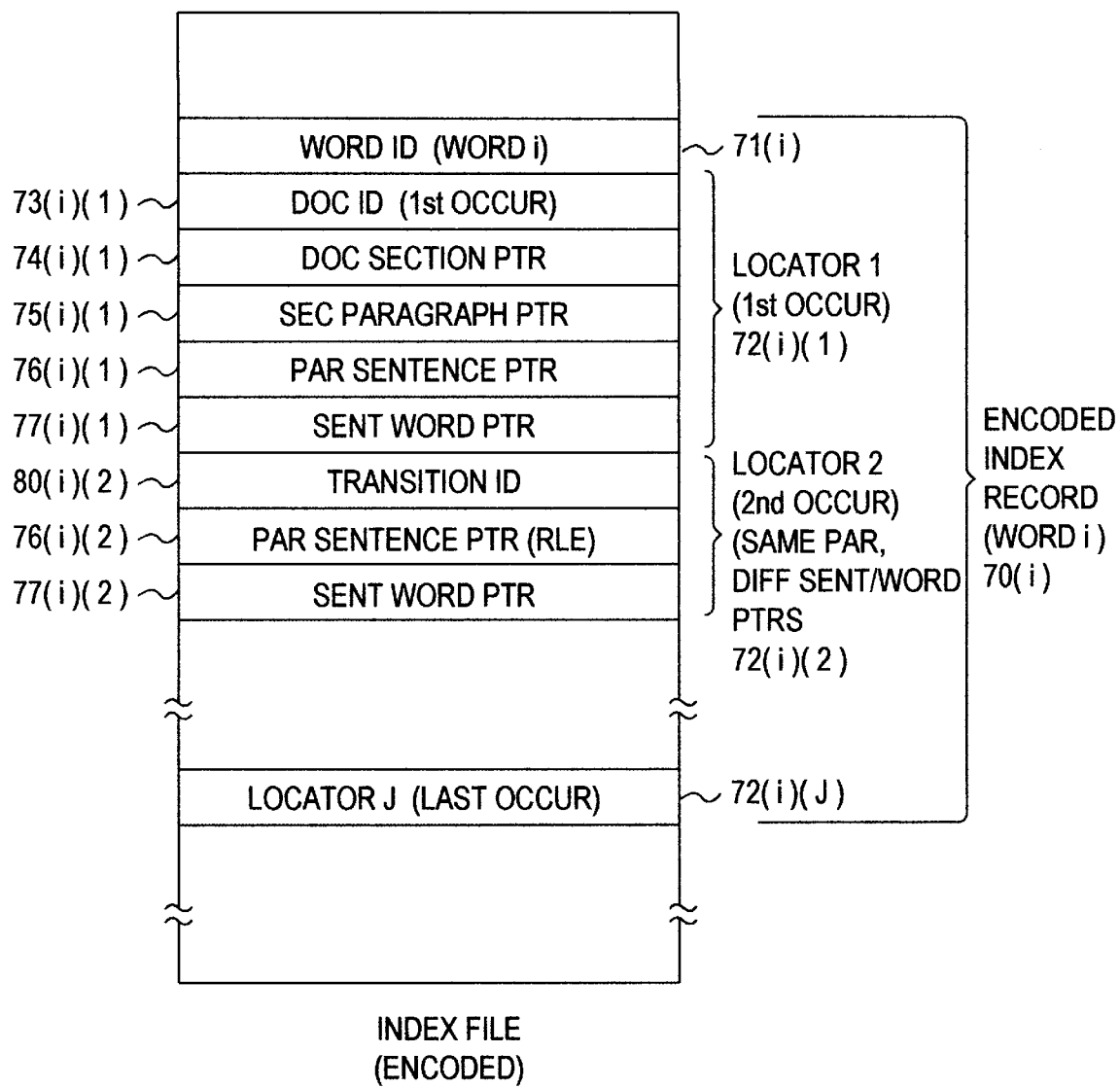

The encoded index file 21, which is shown in FIG. 3B, also comprises a plurality of index records 70(i) (index "i" having values associated with the number of diverse words in the document text base 20 which may be used in a query) each having a word identification field 71(i) which stores the word identifier value of the word associated with the index record 70(i) and one or more locator entries 72(i)(j). Each locator entry 72(i)(j) contains information identifying the location of one occurrence of the word identified by the contents of the word identification field 71(i) in the document text base. Unlike the locator entries 52(i)(j) of the index record 50(i) of the unencoded index file31, all of which have similar structures, the structures of the locator entries 72(i)(j) will differ. An initial locator entry 72(i)(1) includes file fields, including a document identification field 73(i)(1), a document section pointer field 74(i)(1), a section paragraph pointer field 75(i)1), a paragraph sentence pointer field 76(i)(1) and a sentence word pointer field 77(i)(1), which contains similar information as the corresponding fields 53(i)(1) through 57(i)(1) of the corresponding locator entry 52(i)(1). The second locator entry 72(i)(2) may also have fields 73(i)(2) through 77(i)(2) which contain similar information as the corresponding fields 53(i)(2) through 57(i)(2) of the corresponding locator entry 52(i)(2), if the value in particularly the document identification field 73(i)(2) of the second locator entry 72(i)(2) differs from the value in the document identification field 73(i)(1) of the first locator entry 72(i)(1), which would be the case if the occurrences of the word are in different documents in the document text base 20.

However, if the values in one or more of the series of fields 53(i)(2) through 56(i)(2) of the index file 31 are the same as the values in corresponding fields 53(i)(1) through 56(i)(1) [it will be appreciated that the contents of fields 57(i)(1) and 57(i)(2) will not also be the same, otherwise the two locator entries 52(i)(1) and 52(i)(2) would refer to the same occurrence], instead of repeating the contents of all of the fields, in the encoded index file 21 the second locator entry 72(i)(2) contains a transition identification field 80(i)(2) which identifies first field which contains a different value, and values for only that and subsequent fields are provided. Thus, if, for example, in the unencoded index file 31 the contents of the fields 53(i)(2) through 55(i)(2) are the same as the contents of fields 53(i)(1) through 55(i)(1), which would be the case if the first and second occurrences are in the same document, section and paragraph, the first field of locator 72(i)(2) would comprise a transition identifier field 80(i)(2) and only fields 76(i)(2) and 77(i)(2). The transition identifier field 80(i)(2) contains a value indicating that the document identifier, document section pointer and section paragraph pointer values for the second locator 72(i)(2) are the same as corresponding values for the first locator 72(i)(1), thereby essentially identifying the first field after transition identifier field 80(i)(2) as a paragraph sentence pointer field 76(i)(2).

Subsequent locator entries 72(i)(2) through 72(i)(J) may be structured similarly, if they have fields whose contents are the same as in a preceding locator entry. For example, if the locator entry 72(i)(3) is associated with an occurrence of the word in the same document, section and paragraph as occurrences associated with locator entries 72(i)(1) and 72(i)(2), but in a different sentence and with perhaps a different word pointer value, that locator entry 72(i)(3) may be structured similarly to the locator entry 72(i)(2). That is, the locator entry 72(i)(3) will have a transition identifier field 80(i)(3) which contains the same value as transition identifier field 80(i)(2), and a paragraph sentence pointer field 72(i)(3) and a sentence word pointer field 77(i)(3) will be provided to receive the paragraph sentence pointer and sentence word pointer for that occurrence. On the other hand, if the occurrence associated with locator entry 72(i)(3) is in a different paragraph of the same document and section, the transition identifier field 80(i)(3) will have a value indicating that the next field in the locator entry 72(i)(3) is the section paragraph pointer field 75(i)(3), which thereby indicates the fact that the document identifier and document section pointer for the occurrence are the same as for the immediately preceding locator entry 72(i)(2). Since the document identifier and document section pointer for the occurrence referenced for the locator entry 72(i)(2) are the same as for the occurrence referenced for locator entry 72(i)(1), the actual values document identifier and document section pointer for the occurrence associated with locator entry 72(i)(3) are found in locator entry 72(i)(1). Accordingly, while the transition pointer in transition pointer field 80(i)(j) of a locator entry 72(i)(j) essentially serves to identify the nature of the information in the next field of the locator entry 72(i)(j) and to indicate that the values for the fields which are not provided in the locator field 72(i)(j) are the same as in the preceding locator entry 72(i)(j−1), the actual values for those missing fields may be present in an earlier locator entry 72(i)(1) through 72(i)(j−2) in the index record 70(i).

It will be appreciated that the document query processing system 10 may disambiguate transition identifiers in field 80(i)(j) of a locator entry 72(i)(j) from a document identifier field 53(i)(j') of a locator entry 72(i)(j') by, for example, a flag accompanying the respective field to identify the contents as either a document identifier or a transition identifier, or by providing that values used as document identifiers are greater than the maximum value for the transition identifiers.

The value provided in the first field after the transition identifier field 80(i)(j) of a locator entry 72(i)(j) may comprise the actual value of the particular pointer. Alternatively, the value may comprise a value corresponding to the difference between the value of the corresponding field of the preceding locator entry 72(i)(j−1) and the value of the pointer that is associated with the occurrence for the locator entry 72(i)(j), effectively run-length encoding that value.

Figure 4A:
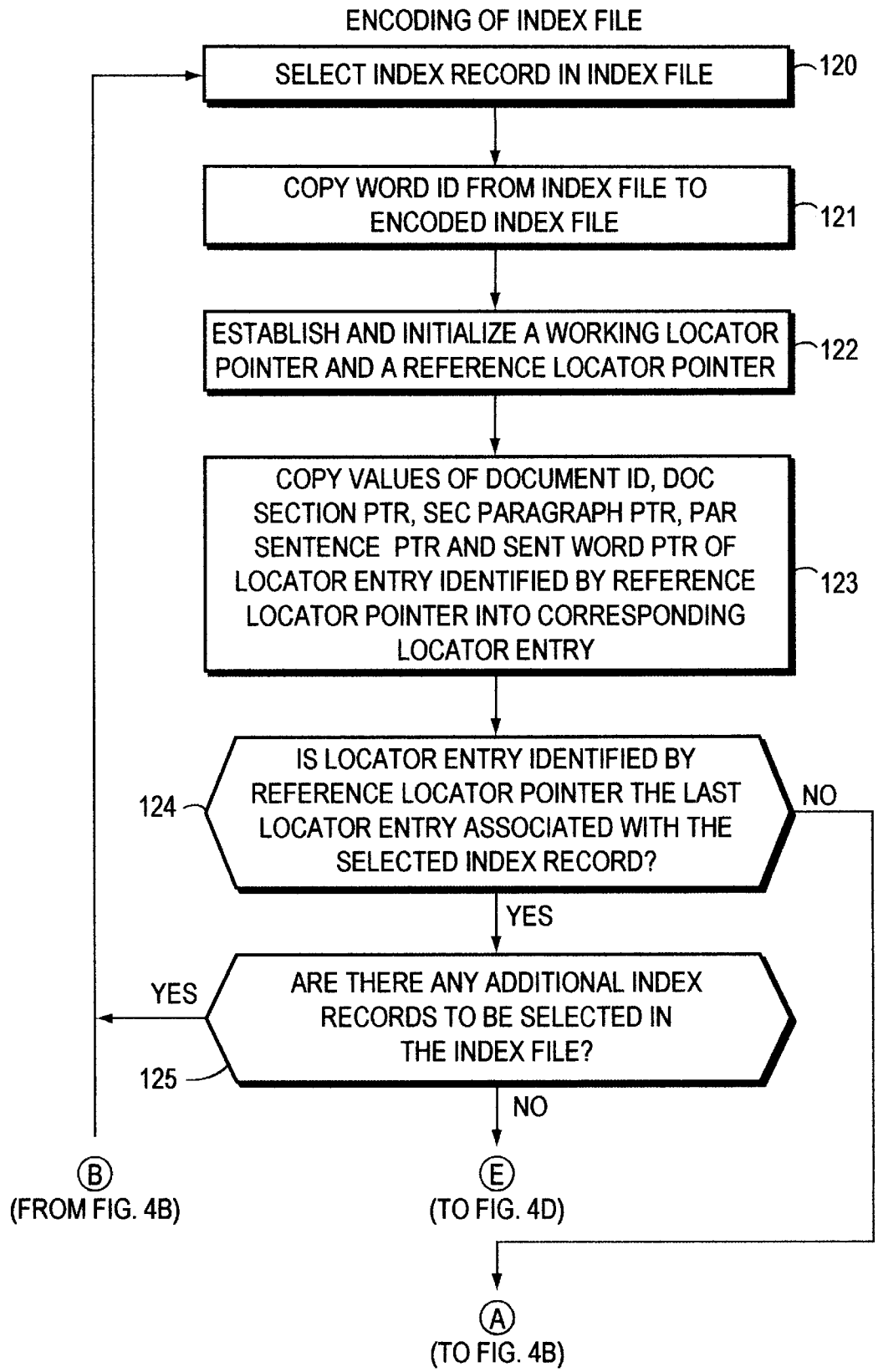
FIGS. 4A through 4D are flow charts which detail the generation of the encoded index file depicted in FIG. 2B in response to the index file depicted in FIG. 2A.

FIGS. 4A through 4D comprise a flow chart detailing operations performed by the index file encoder 33 (FIG. 1)

in generating the encoded index file 21 in response to the index file 31. With reference to FIG. 4A, the index file encoder 33 initially will select the first index record 50(1) in the index file 31 (step 120), and will establish in response the corresponding first encoded index record 70(1) in the encoded index file 21. In establishing the first encoded index record 70(1), the index file encoder 33 first copies the word identifier from the word identifier field 51(1) of the unencoded index file 31 into the word identifier field 71(1) of the encoded index file 21 (step 121). Thereafter, the index file encoder 33 establishes a reference locator pointer and a working locator pointer and initializes them (step 122). The working locator pointer will be used by the index file encoder 33 to identify, as it is generating each of the various locator entries 72(i)(j) of the encoded index file 21 are being generated, the particular locator entry 52(i)(j) of the index record 52(i) for which the index file encoder 33, and the reference locator pointer will be used to identify the particular locator entry 52(i)(j−1) of the index file to be used as in connection with that generation. Accordingly, initially, the reference and working locator pointers will point to the first and locator entry 52(i)(1) and 52(i)(2) of the index record 50(i) of the unencoded index file 31. It will be appreciated that the working locator pointer will also point to the second locator entry 72(i)(2) of the index record 70(i).

Since the index file encoder 33 does not encode the first locator entry 52(i)(j) of an index record, it will copy the values of all of the fields 53(1)(1) through 57(1)(1) of the first locator entry 52(1)(1) of the first index record 50(1) of the index file 31 into corresponding locator entries 73(1)(1) through 77(1)(1) of the first locator entry 72(1)(1) of the first index record 70(1) of the encoded index file 21 (step 123). At this point the reference locator pointer established in step 122 will point to this locator entry 52(1)(1), and so the reference locator pointer may be used to identify the locator entry 52(1)(1) used in step 123. The index file encoder 33 then determines whether the locator entry 52(1)(1) is the last locator entry in the selected index record 50(1) (step 124). If the index file encoder 33 makes a positive determination in step 124, it has processed all of the locator entries in the first index record 50(1) and will then determine whether the index file 31 contains an additional index record 50(2) (step 125). If so, it will return to step 120 to select the next index record 50(2) in the index file 31 and begin performing the operations depicted in FIGS. 4A through 4D, as appropriate, in connection therewith.

If, however, the index file encoder 33 makes a negative determination in step 124, it sequences to step 126 (FIG. 4B) to begin generating an encoded locator entry 72(1)(2) in response to the locator entry 52(1)(2) identified by the working locator pointer, using also the locator entry 52(1)(1) identified by the reference locator pointer. Initially, the index file encoder 33 determines whether any of the sequence of fields 53(1)(2) through 57(1)(2) contain the same respective values as the sequence of fields 53(1)(1) through 57(1)(1). If the index file encoder 33 makes a negative determination in step 126, the values in each of the fields 53(1)(2) through 57(1)(2) differ from respective values in corresponding fields 53(1)(1) through 57(1)(1). In that case, the index file encoder 33 establishes a locator entry 72(1)(1) comprising the complete sequence of fields 73(1)(2) through 77(1)(2) in the encoded index file 21 and copies the values from the corresponding fields 53(1)(2) through 57(1)(2) of the locator entry 52(1)(2) of the unencoded index file 31 into them (step 127). The index file encoder 33 then determines whether the locator entry 52(1)(2) is the last locator entry in the selected index record 50(1) (step 128). If the index file encoder 33 makes a negative determination in step 128, the unencoded index file 31 has at least one additional locator entry 52(1)(3). In that case, the index file encoder 33 updates the working locator pointer and reference locator pointer to point to the locator entries 52(1)(3) and 52(1)(2), respectively (step 130), and returns to step 126 to generate a locator entry 72(1)(3) for the encoded index file.

Returning to step 126, if the index file encoder 33 determines that one or more of the series of values in fields 53(1)(2) through 56(1)(2) of the locator entry 52(1)(2) pointed to by the working locator pointer are the same as the values in corresponding fields 53(1)(1) through 56(1)(1) of the locator entry 52(1)(1) pointed to by the reference locator pointer, it sequences to step 131 (FIG. 4C) to begin a sequence of steps to establish the locator entry 72(1)(2) of the encoded index file 21. The index file encoder 33 initially identifies the first of the series of values of the document identifier in field 53(1)(2) and 53(1)(1), document section pointer in field 54(1)(2) and 54(1)(1), section paragraph pointer in field 55(1)(2) and 55(1)(1), paragraph sentence pointer in field 56(1)(2) and 56(1)(1), or sentence word pointer in field 57(1)(2) differ from the corresponding value in field 53(1)(1), 54(1)(1), 55(1)(1), 56(1)(1) or 57(1)(1) (step 131). In response to the field identified in step 131 [which will be identified as field 5X(1)(2), where "X" is a digit between three and seven] the index file encoder 33 generates a transition identifier value, which it loads into the transition identifier field 80(1)(2) of the locator entry 72(1)(2) of the encoded index file 21 (step 132). In addition, the index file encoder 33 generates a value corresponding to the difference between the values contained the fields 5X(1)(2) and 5X(1)(1), which it loads into the first field 7X(1)(2) (where "X" has the same meaning as set forth above) after the transition identifier field 80(1)(2) of the same locator entry 72(1)(2) (step 133). The index file encoder 33 then copies the values of any subsequent fields 5Y(1)(2) (where "Y" represents a digit corresponding to X+1) through 57(1)(2) into corresponding fields 7Y(1)(2) through 77(1)(2) to complete the locator entry 72(1)(2) of the encoded index file 21 (step 134).

Figure 4B:
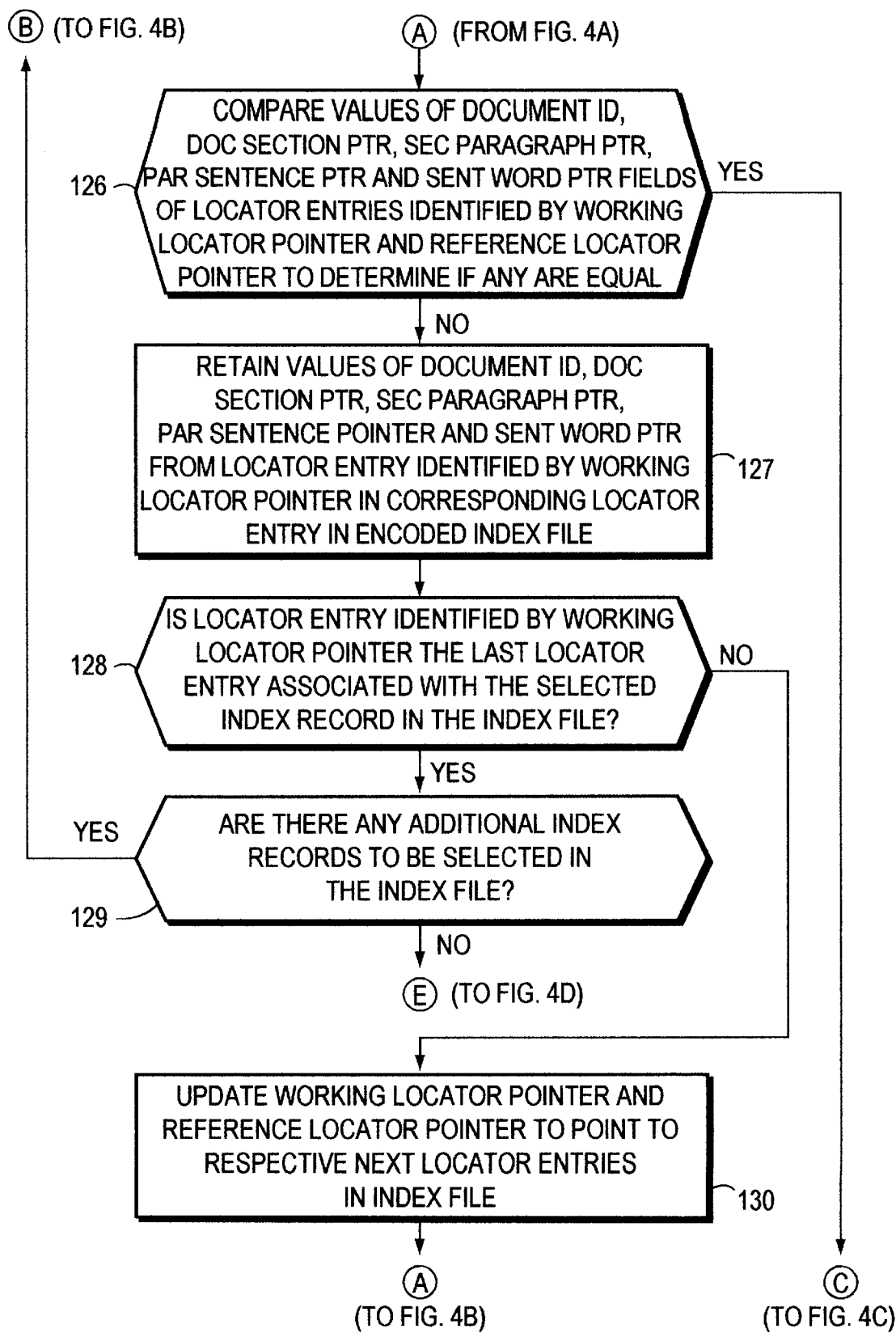
Figure 4C:
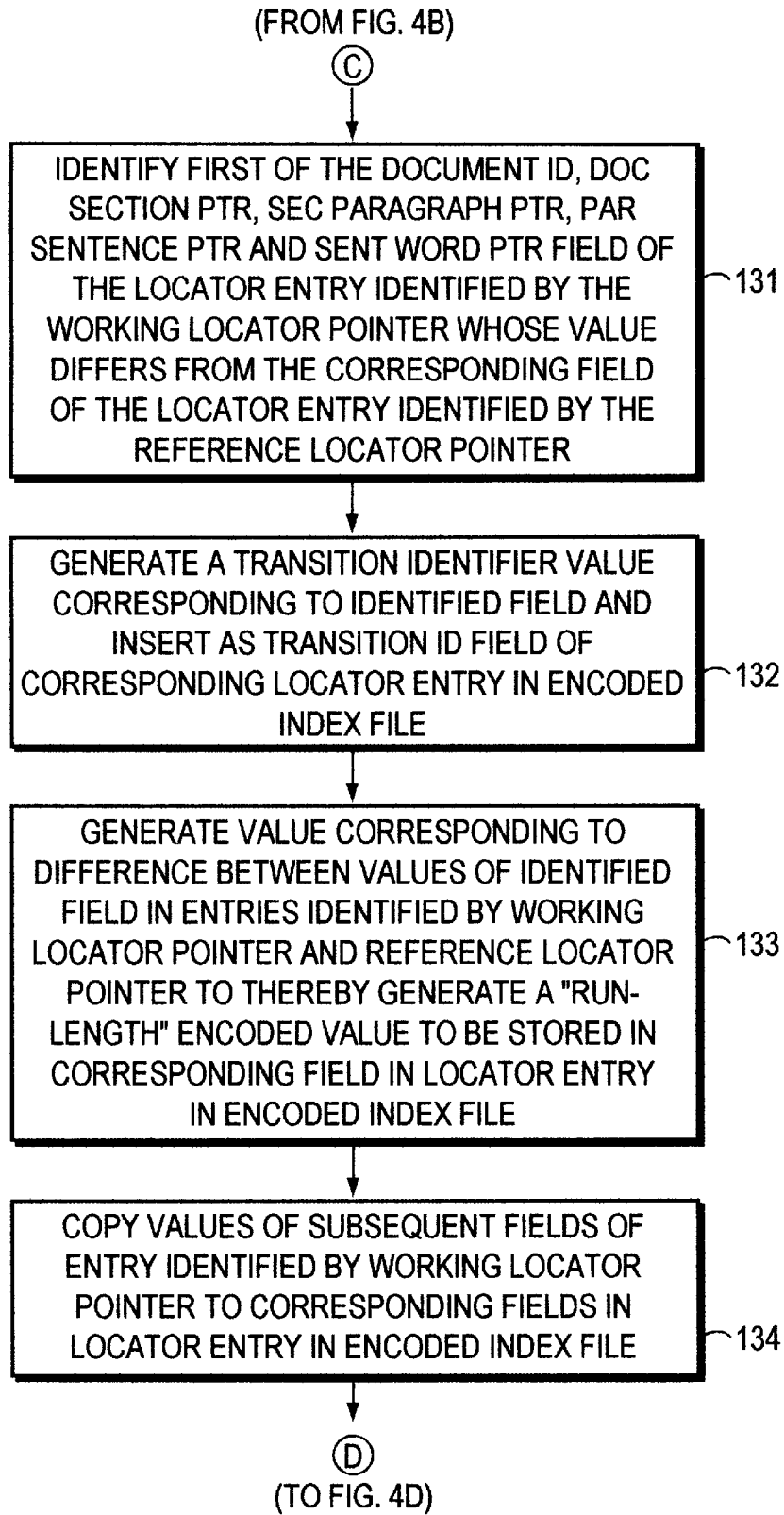
Figure 4D:
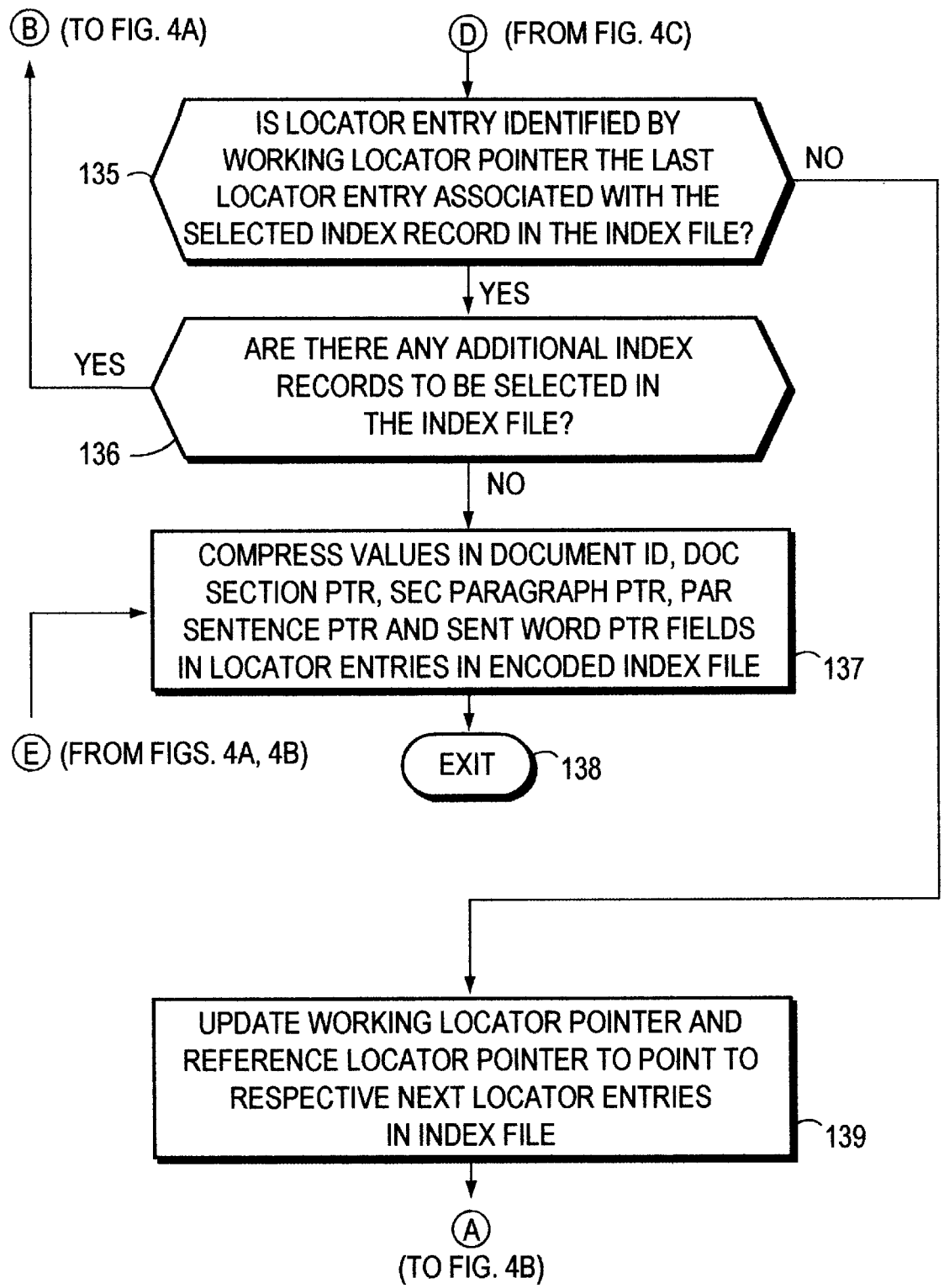

After establishing the locator entry 72(1)(2) for the encoded index file 21, the index file encoder 33 determines whether the locator entry 52(1)(2) is the last locator entry in the selected index record 50(1) (step 135, FIG. 4D). If the index file encoder 33 makes a negative determination in step 146, the unencoded index file 31 has at least one additional locator entry 52(1)(3). In that case, the index file encoder 33 updates the working locator pointer and reference locator pointer to point to the locator entries 52(1)(3) and 52(1)(2), respectively (step 139) and returns to step 126 (FIG. 4B) to generate a locator entry 72(1)(3) for the encoded index file.

It will be appreciated that the index file encoder 33 will perform a number of iterations in connection with steps depicted on FIGS. 4B through 4D, the number of iterations depending on the number of locator entries 52(1)(J) in the index record 50(1). At some point, the index file encoder 33 will determine in either step 128 (FIG. 4B) or step 135 (FIG. 4D) that the working locator pointer identifies the last locator entry 52(1)(j) in the index record 50(1), it which case it will have finished generating locator entries 72(1)(1) through 72(1)(J) of the encoded index record 70(1). In that case, the index file encoder 33 sequences to respective step 129 or 136 to determine whether there is an additional index record 50(2) in the index file 31. If so, the index file encoder 33 returns to step 120 to select the next index record 50(2) in the index file 31 and perform the operations described above in connection with FIGS. 4A through 4D, as appropriate in connection therewith.

At some point the index file encoder 33 will determine, in either step 125, 129 or 136, that it has performed the operations described above in connection with all of the index records 50(i) in the index file 31, and that it has generated the encoded index file 21 containing corresponding encoded index records 70(i) for all of the index records 50(i). The index file encoder 33 may at that point compress the values in the previously-generated fields 73(i)(j) through 77(i)(j) (step 137), to create a compressed encoded index file, and then exit (step 138). One illustrative compression arrangement for generating the compressed values is described below. It will be appreciated that, as an alternative to performing the compression after generating all of the encoded index file 21, the index file encoder 33 may perform the compression after generating any one or more of the values which it would otherwise insert into respective fields 73(i)(j) through 77(i)(j).

FIGS. 5A through 5D are flow charts which detail procedures used by the index file decoder 44 in decoding of encoded index records from the encoded index file 21 while the document query processing system 10 is processing a response to a query. The procedure used by the index file decoder 44 will be substantially the reverse of those used by the index file encoder 33, and will not be described here in detail. It will be appreciated that the index file decoder 44 will not decode the entire encoded index file 21, but only the ones of the encoded index records 70(i) which are related to the words in the query. The index file decoder 44 may operate in a batch operating mode, in which it performs the operations described in FIGS. 5A through 5D in connection with all of the encoded index records 70(i) related to all of the words set forth in the query.

Alternatively, the index file decoder 44 may operate in an interleaved mode in which it operates on locator entries 72(i)(j) from encoded index records 70(i) related to various ones of the words of a query on an interleaved basis; in this mode, the index file decoder 44 may operate interactively with the document and location identifier module 45. When operating interactively, the document and location identifier module 45 may enable the index file decoder 44 to decode one or more locator entries 72(i)(j) from encoded index records 70(i) as selected by it (module 45) to alternatingly enable identification of the documents and locations for one or another of the words in the query. Operating in this mode may require less storage as the document query processing system 10 will not need to store the entire decoded contents of the index records decoded for the various words of the query.

As noted above, in step 137 (FIG. 4D) the contents of selected fields of various fields of the locator entries 72(i)(j) of the encoded index records 70(i) are compressed, and in step 151 the contents are decompressed. One compression technique will be described in connection with FIGS. 6 and 7. With reference to FIG. 6, the compression technique, which will be referred to herein as an "n,s" compression, represents an integer "i" as one or more groups of "n" bits (each group being identified herein as an "encoding bit group") followed by "s" stop bits, where "n" and "s" are both integers. The integer "i" to be compressed is first represented in the form of a base "b" number by the series of coefficients "$a_n \ldots a_o$" determined by the equation $$i = a_n b^n + a_{n-1} b^{n-1} + \ldots + a_2 b^2 + a_1 b^1 + a_0 b^0 \qquad \text{[Eqn. 1]}.$$

In the compressed representation for integer "i," each of the coefficients "$a_j$" is expressed in binary-encoded form. It will be appreciated that (1) the value of each of the individual coefficients "$a_j$" is less than the value of the base "b," and (2) the binary-encoded representation for each of the coefficients "$a_j$" has at most "n" bits, and will be used to form one of the encoding bit groups in the compressed representation.

The series of stop bits represents a code which demarcates the end of the integer "i" in the compressed representation and may be conveniently selected to be a predetermined number of binary digits all having the value "one." The value of base "b" used in determining the values of coefficients "$a_j$" is selected in response to the values of "n" and "s" as described in the following. First, it will be appreciated that the series of bits comprising the stop bits cannot correspond to the beginning of any encoding bit group, since otherwise during decoding the series of bits from an encoding bit group which corresponds to the stop bits will be interpreted as being stop bits. Accordingly, if "n" is the number of bits in an encoding bit group:

(1) if the number of stop bits is equal to "n," the base will be considered to be the binary-encoded value of the stop bits, (2) if the number of stop bits is less than "n," the base will be considered to be the binary encoded value of an n-bit number comprising the stop bits as high-order bits and zeros as the low-order bits, and (3) if the number of stop bits is greater than "n," the base will be considered to be the binary encoded value of the high-order "n" stop bits, thereby to guarantee that no coefficient $a_j$ determined in response will have a binary encoding which will have a bit pattern, starting from the highest-order bit, which corresponds to the bit pattern of the stop bits. Thus, if the stop bits are all "ones", and if the value of "s" is less than or equal to "n," the base will be determined as:

$$b = 2^n - 2^{n-s} \qquad \text{[Eqn. 2A]}$$

whereas, if "s" is greater than "n," the base will be determined as:

$$b = 2^n \qquad \text{[Eqn. 2B]}.$$

FIG. 6 depicts a table various compressed encodings of value "i'" using the "n,s" encoding technique in which both "n" and "s" equal two, with both stop bits having the value "one." In that case, the base, as determined by equation Eqn. 2A, is three. The table in FIG. 6 contains several columns headed "i," "Compressed Encoding," "N" and "i'." In the Compressed Encoding column are presented various encodings divided into four sections "N" identified as sections 0, 1, 2 and 3. All of the encodings have stop bits "11" as indicated at the right in the Compressed Encoding column. The encoding in section 0 has no binary encoding groups, the encodings in section 1 have bits comprising one binary encoding group, the encodings in section 2 have bits comprising two binary encoding groups and the encodings in section 3 have bits comprising three binary encoding groups. The values in column "i'" in the row of the table indicate the value of the integer encoded pursuant to the "n,s" encoding technique as described above.

It will be appreciated that the number of encodings in each section will correspond to a value corresponding to the base raised to a power corresponding to the number of binary encoding groups associated with the section. Thus, for example addition, section "0," in which the compressed encodings have no binary encoding groups, has one (that is, $3^0$) compressed encoding, which consist merely of the stop bits, and which represents the value zero. Section "1", on the other hand, whose compressed encodings comprise one binary encoding group, has three ($3^1$) compressed encodings, which consist of the binary encoded representations for values "zero," "one" and "two," as indicated in the column headed "i'." Section "2," whose compressed encodings comprise two binary encoding groups, has nine ($3^2$) compressed encodings, which consist of the binary-encoded representations for values "zero" through "eight," as indicated in the column headed "i'." Finally, section "3," whose compressed encodings comprise three binary encoding groups, has twenty-seven ($3^3$) compressed encodings, which consist of the binary encoded representations for values "zero" through "twenty-six," as indicated in the column headed "i'."

An examination of FIG. 6 will reveal that the compressed encodings are not unique. That is, the value of "i'" corresponding to "zero" has four different encodings, one in each of the sections. Similarly, the values of "i'" corresponding to "one" and "two" have three different encodings, one in each of sections one through three, and values of "i'" corresponding to "three" through "eight" have two different encodings in sections two and three. Thus, rather than having both the compressed encoding of section "0" and the first compressed encoding of section "1" have the value of "i'" corresponding to zero, the first compressed encoding of section "1" could have the value of "i'" corresponding to "one" and the others in the section could correspond to values "two" and "three," as shown in the column of FIG. 6 headed "i." Similar observations hold as between all sets of successive sections.

To accommodate such a compressed encoding scheme, a relationship is established between "i" and "i'" as follows:

$i=i'+\delta$ [Eqn. 3].

The value of delta "δ" in equation Eqn. 3 will be related to the base "b" and the section number "N" for the value "i," as these govern the degree of overlap of the values of "i'" from each section to the next. Since the degree of overlap is (1) cumulative with successive sections and (2) increases polynomially in the value of the base, the value of delta δ is found for values of "i" not equal to zero (that is, "N" not equal to "one") by the equation:

$\delta=\Sigma b^n$ (sum over "n" from zero to N-1) [Eqn. 4A]

{which is equivalent to:

$\delta=(b^N-1)/(b-1)$ [Eqn. 4A']}, or:

$\delta=0$ for value of "i" equal to zero [Eqn. 4B].

The value of the section "N" for a particular value "i" is also related to the base "b," since that will be one factor in the number of compressed encodings in successive sections, and also the value of "i." In addition, an examination of FIG. 6 suggests that the section number "N" is generally a stepwise function that is logarithmic in the base "b," that is, the value of "N" will change at the beginning of each section. Combining equations Eqn. 3 and Eqn. 4A' and rearranging for the section number "N" gives:

$N=log_b[(b-1)(i-i')+1]$ [Eqn. 5].

It will be appreciated that the value of factor "i-i'" in equation Eqn. 5 is a constant equal to the first value of "i'" in the section. It will also be appreciated, however, that the value for section number "N" can be determined without having to know the first value of "i" in each section, by use of the "greatest integer" function in connection with equation Eqn. 5 and by substituting "i" for the factor "i-i'" in equation Eqn. 5. This follows from the fact that the integer portion of the value determined in connection with equation Eqn. 5 will not change until the value of "i" has reached the next higher section. Accordingly, the value of the section number "N" for a particular value "i" is given by $N=GI\{log_b[(b-1)i+1]\}$ [Eqn. 6], where "GI" indicates the "greatest integer" function, that is, it indicates that the value of "N" corresponds to the integral portion of the value of the logarithm determined in equation Eqn. 5.

Given values for "n," "s" and "b" having the relationship as described above, particularly in connection with equations Eqn. 2A and 2B, to generate an encoded representation "i'" for an integer "i," the value of "N" can be determined in accordance with equation Eqn. 6, and that value can then be used to determine the value for δ in accordance with equation Eqn. 4A or Eqn. 4A'. The value of δ is then used to determine a value for i' in accordance with equation Eqn. 3. Given the value of "N," which, in turn, identifies the number of encoding groups in an encoding, and the value of i', the specific values for each of the encoding groups can be determined substantially in accordance with equation Eqn. 1, since the value represented by each encoding group is essentially the coefficient "$a_j$" of the polynomial expression (equation Eqn. 1) for i' for the respective base "b." The values for the successive encoding groups can then be represented in binary form, as shown in FIG. 6, or in any other selected form, and the stop bits added to provide the encoded representation "i'."

On the other hand, given an encoded representation i' and values of "n," "s" and "b" as described above, the value of integer "i" represented thereby can be determined by counting the number of encoding groups comprising the encoded value. The value represented by the encoded representation for i', to be used in connection with equation Eqn. 3, can be determined by treating each encoding group in the encoded representation for i' as the coefficient "$a_j$" of the polynomial expression (equation Eqn. 1) with respect to the base "b." Since the number of encoding groups, corresponds to the value of "N," the values of "N" and base "b" can be applied to equations Eqn. 4A, 4A' or 4B to determine a value for δ, which, in turn, is used with the value for i' in equation Eqn. 3 to determine the value for "i."

Figure 7:
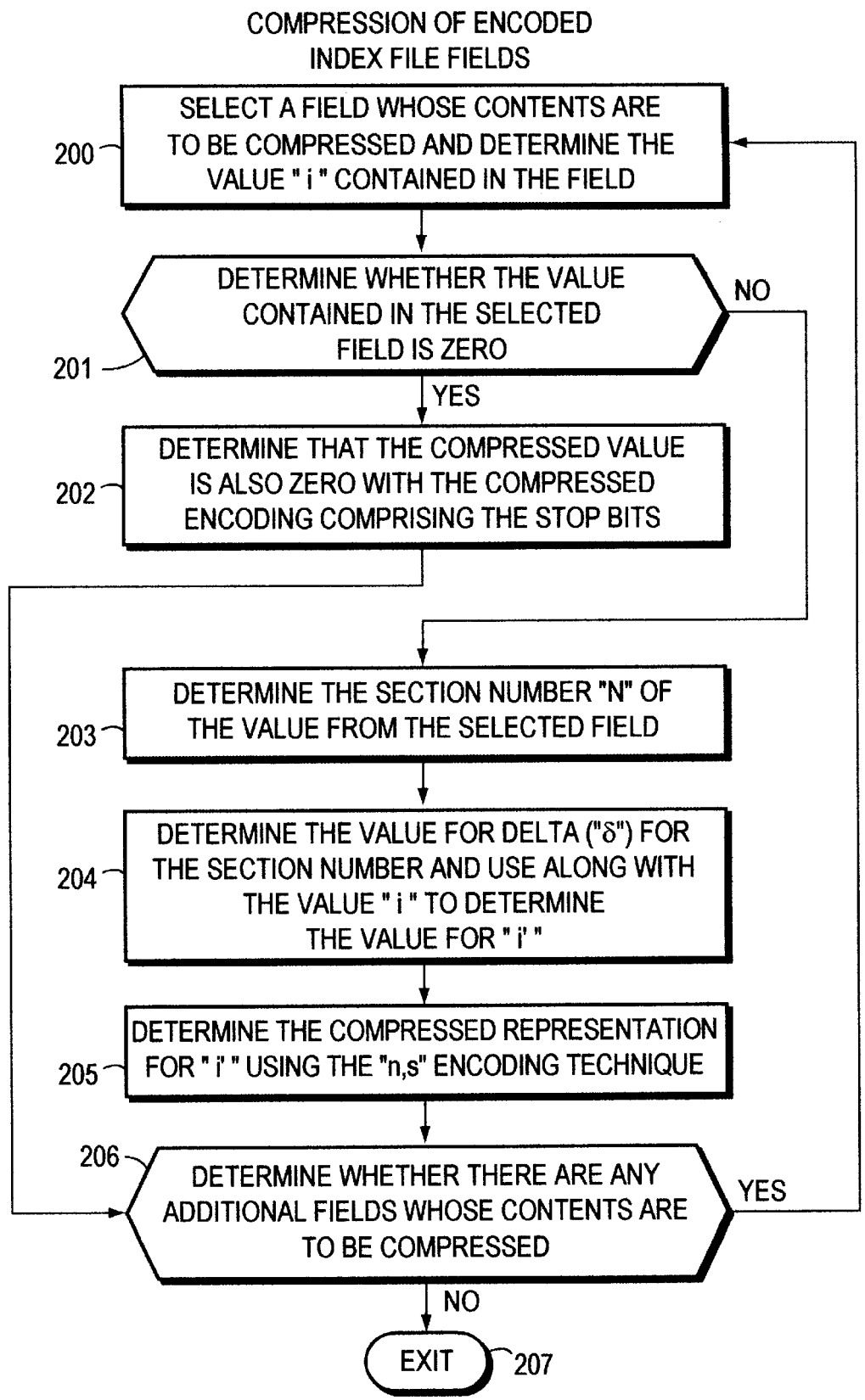
FIG. 7 is a flow chart which details a compression technique used in generating compressed values for various fields of the encoded index file.

With this background, the operations performed by the index file encoder 33 (FIG. 1) in compressing each of the various fields whose value is to be compressed using selected values for base "b," the number of bits "n" comprising an encoding bit group and the number of stop bits "s," will be described in connection with FIG. 7. With reference to FIG. 7, the index file encoder 33 initially selects a non-compressed field from the encoded index file 21 whose contents are to be compressed. As noted above, the index file encoder 33 may compress the contents of any of the fields 73(i)(j) through 77(i)(j) of a locator entry 72(i)(j) (FIG. 2B), but in one particular embodiment does not compress the contents of the transition identifier fields 80(i)(j) of the locator entries 72(i)(j). Initially, the index file encoder 33 will select a field whose contents are to be compressed, and will determine the value contained in the field (step 200). This value will be taken as the value "i" in the above discussion in connection with equations Eqn. 1 through Eqn. 6. The index file encoder 33 will then determine whether the value contained in the selected field is zero (step 201). In accordance with equations Eqn. 3 and 4A and FIG. 6, if the index file encoder 33 makes a positive determination in step 201, it will also determine that the corresponding value "i'" is also zero and that the compressed encoding comprises the stop bits (step 202). After determining the compressed encoding in step 202, the index file encoder 33 will sequence to step 206 to determine whether there are any additional fields whose contents are to be compressed. If so, it will return to step 200 to select another field and perform the operations depicted in FIG. 7 in connection therewith.

If, on the other hand, the index file encoder 33 makes a negative determination in step 201, it will sequence to step 203, in which it determines the section number "N" of the value "i" from the selected field. In that operation, the index file encoder 33 may determine the value of "N" using the equation Eqn. 6 above. The index file encoder 33 will then use the value of "N" to determine the value for delta "δ" in accordance with equation Eqn. 4A above (step 203) and then use the values of "i" and "δ" to determine the value for "i'" (step 204).

Thereafter, the index file encoder 33 will use the value for "i'" to determine the compressed encoding (step 205). In that operation, the index file encoder 33 applies equation Eqn. 1 to determine the values of the coefficients $a_j$, which coefficients, in binary-encoded form, constitute the binary encoding groups of the compressed encoding. In particular, it will be appreciated that, since the section number "N" determined in step 203 identifies the number of binary encoding groups in the compressed encoding, it will identify as well the highest-indexed coefficient $a_N$. This coefficient $a_N$, in turn is the value of the largest integer in the quotient formed by dividing the value "i'" by "$b^N$", and thus the index file encoder 33 may determine the value of coefficient $a_N$ either by iteratively performing this division operation "N" times, or by explicitly determining the value of "$b^N$" and dividing it into "i'." The values of the succeeding coefficients $a_{N-2}$ through $a_0$ (generally "$a_n$"), if any, will be determined by iteratively performing the corresponding operation in connection with the value of the remainder resulting from the division operation performed in the previous iteration and the value of the base raised to the corresponding power "$b^n$." The binary representation of the compressed encoding will be the binary-encoded values of the successive coefficients $a_N$ through $a_0$, along with the stop bits.

After determining the compressed encoding in step 205, the index file encoder will sequence to step 206 to determine whether there are any additional fields whose contents are to be compressed. If so, it will return to step 200 to select another field and perform the above-described operations in connection therewith.

Figure 5A:
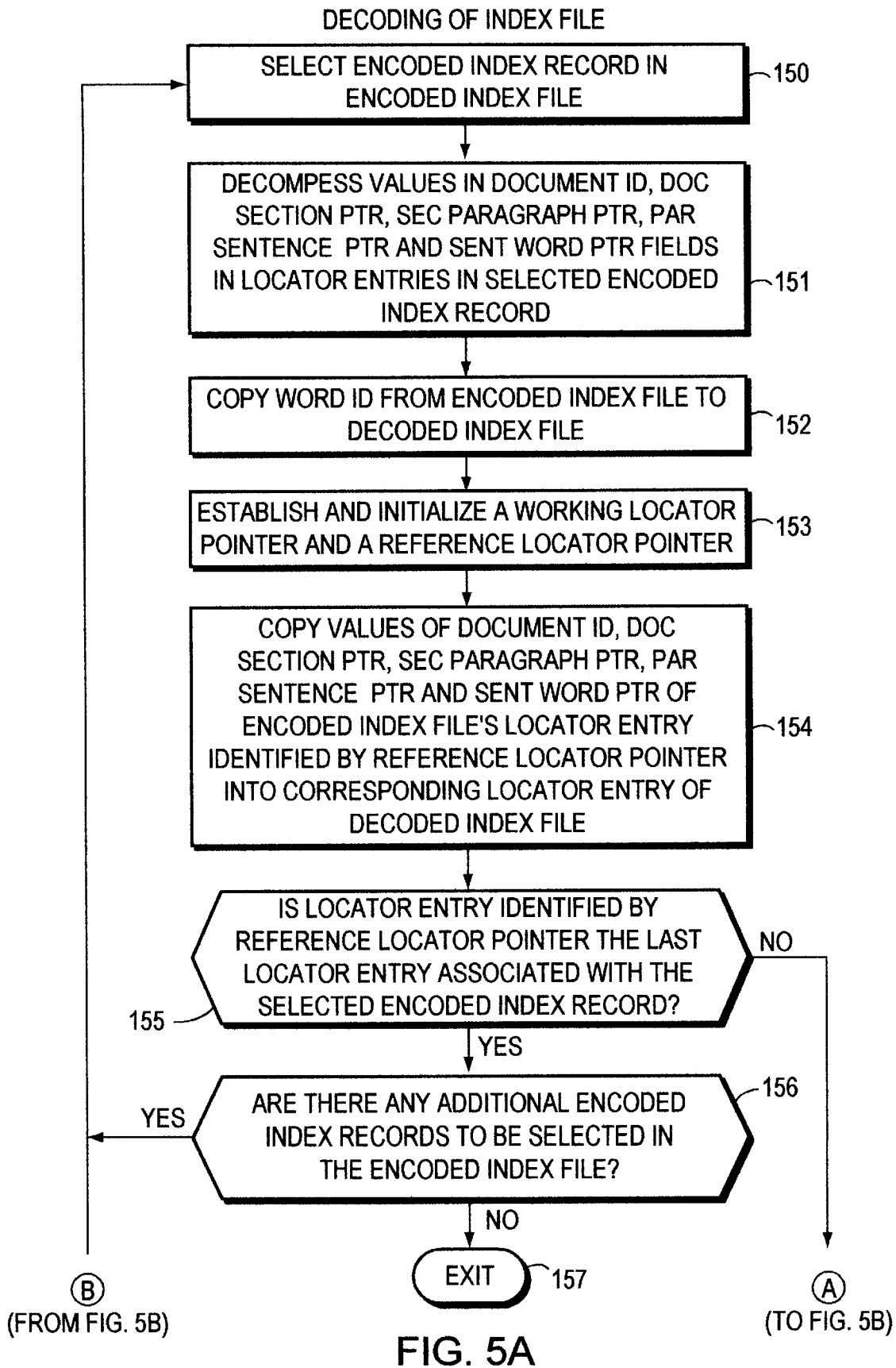
FIGS. 5A through 5D are flow charts which detail the decoding of the encoded index file while the document query processing system is processing a response to a query.
Figure 5B:
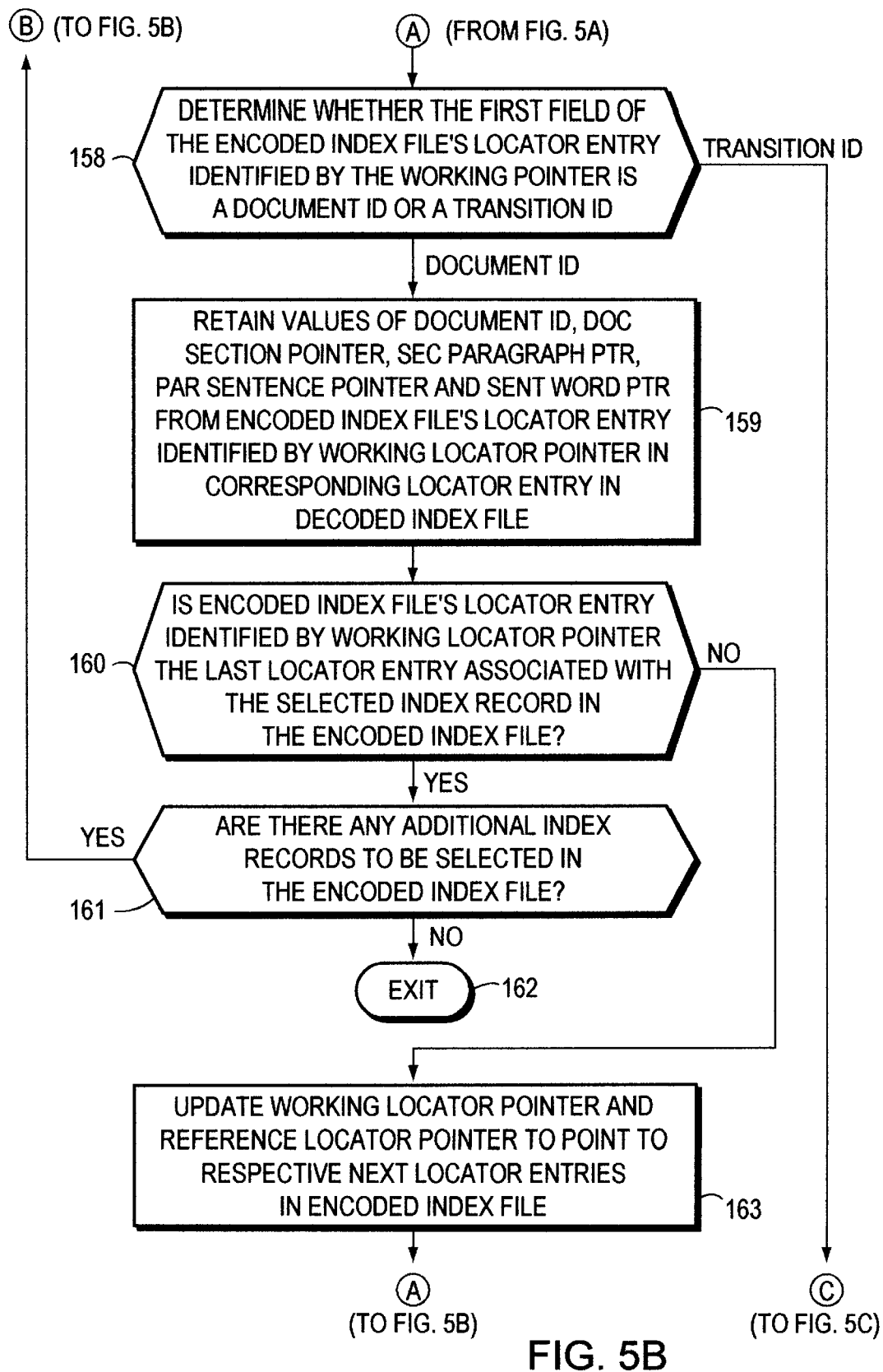
Figure 5C:
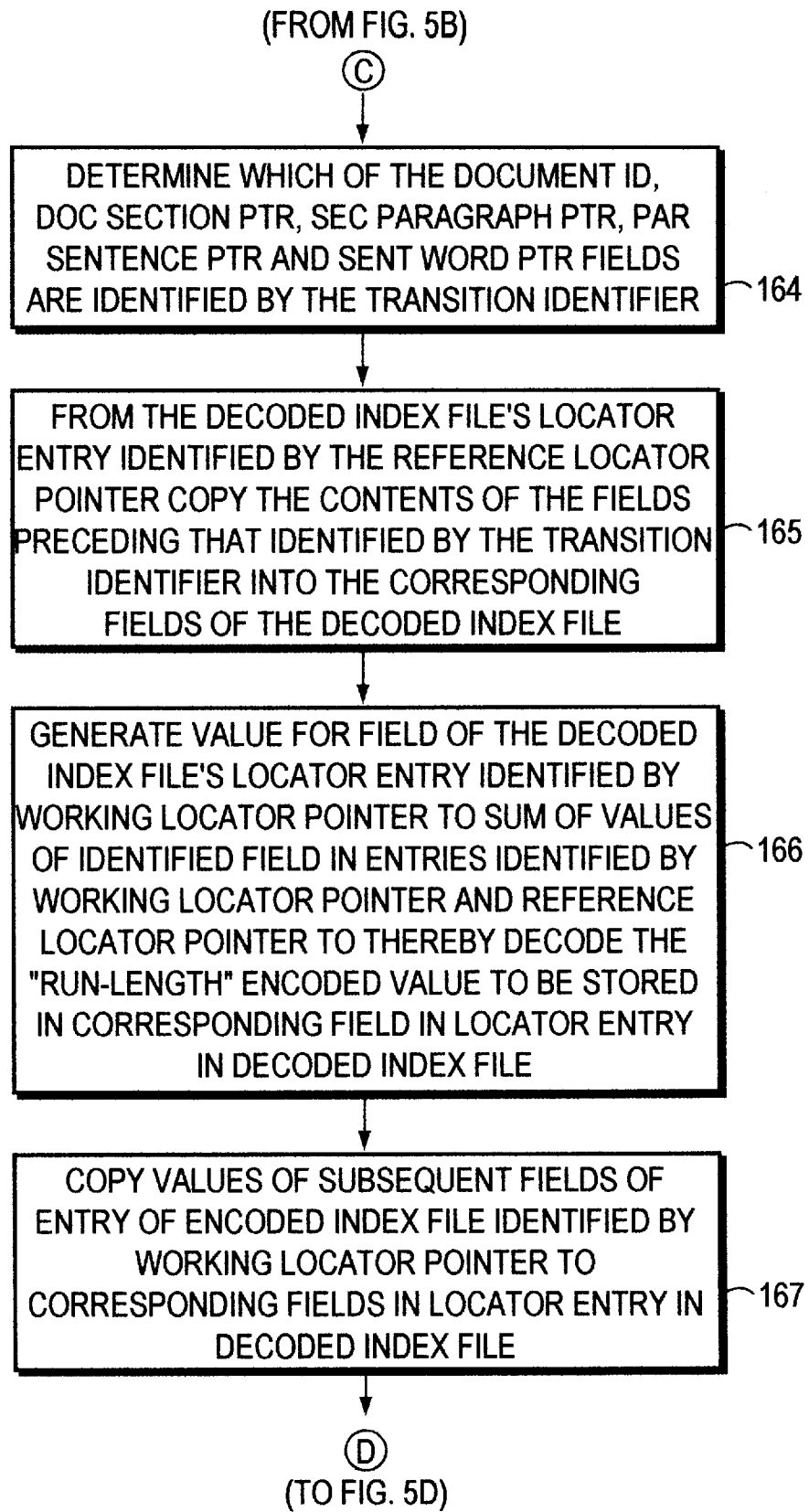
Figure 5D:
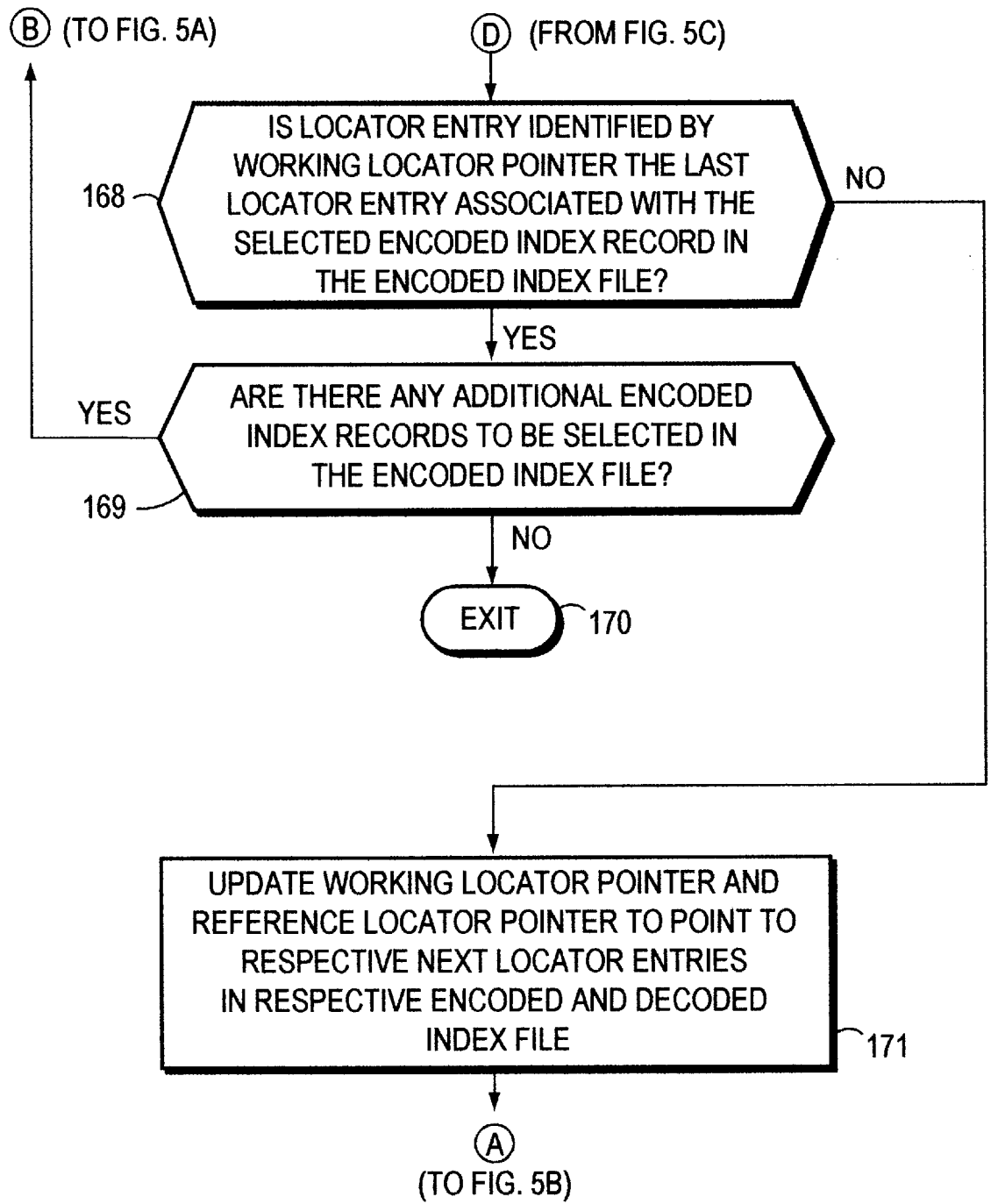

As noted above, the index file decoder 44 will perform a decompression operation in connection with the compressed encodings in the compressed index records as selected by the index file lookup module 43(step 151, FIG. 5A). It will be appreciated that the operations performed in connection with a decompression operation will be substantially the reverse from those described above in connection with FIG. 7.

While the document database generator portion 11 of the document query processing system 10 (FIG. 1) has been described in connection with generation of the entire encoded index file 21 and the dictionary 22 in response to the entire document text base 20, it will be appreciated that if documents are added to the document text base 20 it may be undesirable for the entire encoded index file 21 and dictionary to be completely regenerated. Instead, the document database generator portion 11 may generate appropriate locator entries 72(i)(j) to be appended to the index records 70(i) for the appropriate words in the added documents, as well as to update the entries in the dictionary.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A document database generator for use in connection with a document query processing system, the document database generator generating an encoded index file and a dictionary in response to a document text base, the document text base including a plurality of words organized into at least one document, each word having an associated location identifier identifying the location of the word in the at least one document, the location identifier having a series of location identifier entries for identifying the location in the at least one document of the associated word in a location hierarchy, the document database generator comprising:

A. an index file generating element for generating an index file including a plurality of records each associated with a unique word in the document text base, each records having at least one locator entry, with each locator entry identifying a location of the word in the at least one document, each locator entry having a series of locator fields containing locator values according to a location hierarchy;

B. an encoded index file generating element for generating, in response to the index file generated by the index file generating element, an encoded index file, the encoded index file generating element in generating the encoded index file selecting locator entries in a record in the index file which have a series of locator fields which contain corresponding locator values, and substituting for the series in one of the selected locator entries an indicator indicating the correspondence of the locator fields to the other of the selected locator entries; and C. a dictionary generating element for generating a dictionary field comprising a plurality of record location identifiers each identifying one of the words in the document text base and the location in the encoded index file of an encoded record associated with the identified word.

2. A document query processing system comprising:

A. a document database including:

i. a document text base including a plurality of words organized into at least one document, each word having an associated location identifier in the at least one document;

ii. an encoded index file including a plurality of encoded records, each associated with a unique word of the document text base, each record having a locator entry that is associated with each instance of the word that is associated with the record in the document text base, with records associated with words having a plurality of instances in the document text base having a series of locator entries, each locator entry storing location information identifying a location of a word associated with the locator entry in the document text base, the location information of successive locator entries in a record being encoded such that, for a selected locator entry in a record which is directed to a word which has a location in the document text base with a selected correspondence to a location of a word associated with a preceding locator entry in the record, the location information comprises a correspondence reference to the preceding locator entry; and iii. a dictionary including a plurality of record location identifiers each identifying one of the words in the document text base and the location in the encoded index file of an encoded record associated with the identified word;

B. a query processing element comprising:
  i. a query processing element for receiving a query, said query comprising at least one query word;
  ii. a dictionary lookup element for using the query word to identify a record location identifier in said dictionary corresponding to said query word; and
  iii. an encoded index file processing element for using the record location identifier identified by the dictionary to locate a record in the encoded index file and for decoding the encoded locator values in the locator entries in the record to generate pointers each identifying locations in the document text base of instances of the query word, the encoded index file processing element, in decoding the encoded index file, determining for a selected locator entry which contains a correspondence reference, the location information from the preceding locator entry, the encoded index file processing element using the location information from the preceding locator entry in generating the pointer for the selected locator entry.

3. A document query processing system as defined in claim 2 in which words in the document text are organized into a document hierarchy having a plurality of levels, each locator entry comprising a plurality of fields each associated with a level in the hierarchy, each correspondence reference further containing level information identifying the number of levels in the hierarchy for which the location information for the selected location entry has the selected correspondence with the location information for the preceding location entry.

* * * * *